J. FISHER.
DENTAL METER.
APPLICATION FILED JULY 29, 1919.

1,361,376.

Patented Dec. 7, 1920.

INVENTOR
J. Fisher
BY
ATTYS

UNITED STATES PATENT OFFICE.

JOSEPH FISHER, OF WINNIPEG, MANITOBA, CANADA.

DENTAL METER.

1,361,376.  Specification of Letters Patent.  Patented Dec. 7, 1920.

Application filed July 29, 1919. Serial No. 314,131.

*To all whom it may concern:*

Be it known that I, JOSEPH FISHER, of the city of Winnipeg, in the Province of Manitoba, Canada, have invented certain new and useful Improvements in Dental Meters, of which the following is the specification.

The invention relates to improvements in dental meters and the principal object of the invention is to provide a dental meter specially adapted for measuring the circumference of teeth by means of a wire and to arrange the meter such that the wire is carried by a spool and can be continuously drawn from the meter to take measurements and thereby avoid having to set up individual pieces of wire as is at present done.

With the above object in view the invention consists essentially in a tubular casing, a spool container or housing attached to the casing, a pair of clamping jaws within the casing, means for manipulating the jaws and a spool of wire within the spool casing and threaded through the tubular casing and between the jaws and out the end of the tubular casing, the parts being arranged and constructed as hereinafter more particularly described and later pointed out in the appended claims, reference being had to the accompanying drawing in which:—

In the drawing like characters of reference indicate corresponding parts in the several figures.

Figure 1:
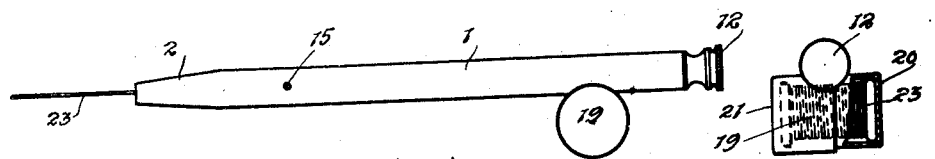
Figure 1 represents a side view of the dental meter.
Figure 2:
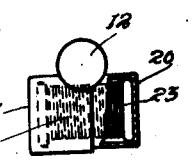
Fig. 2 is an end view of the meter, a part being broken away to expose interior construction.
Figure 3:
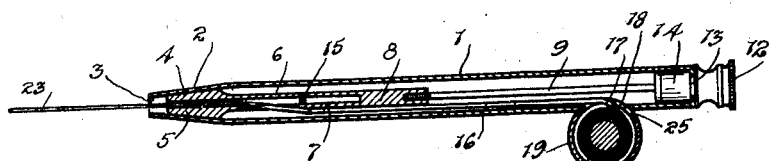
Fig. 3 is a longitudinal sectional view through the meter, certain parts being shown in side elevation and the jaws withdrawn.

1 is a tubular casing having the rear end open and the front end tapered as indicated at 2 and terminating in a contracted front opening 3. Within the front end of the casing I locate a pair of spring gripping jaws 4 and 5 which are coned complementary to the coned end of the casing and are carried at the ends of spring arms 6 and 7 extending from a short body piece or spindle 8. To the spindle 8 I secure permanently a shank or rod 9 which extends toward the rear of the casing and terminates in an enlarged screw threaded end 10 backed by a guide disk 11.

12 represents an adjusting finger piece fitted with a circumscribing groove 13 and an extending sleeve 14, the sleeve being interiorly screw threaded to receive the threaded end 10 of the shank. Actually the sleeve is rotatably received within the end of the casing 1 and is held against end movement by flanging the end of the casing into the groove 13. 15 represents a cross pin secured to the casing 1 and passing between the arms. This pin prevents rotary movement of the jaws within the casing.

From this arrangement it will be apparent that upon one turning the finger piece 12 he can advance or recede the jaws and thereby cause them to close together or to spring apart by virtue of their engagement with the coned end of the casing.

To the arm 7 I secure a threading tube 16 which passes backwardly within the casing and terminates in a downwardly bent end 17 which extends into a lower comparatively large opening 18 provided in the rear end of the casing and which opens to the top side of the spool casing 19. The spool casing is formed from two telescoping sections, one section 20 being permanently secured to the under side of the casing 1, while the other section is removable and telescopes over the open end of the stationary section. This arrangement allows of the ready insertion within the casing 19 of a spool 22 carrying a coil of wire 23.

In order to facilitate in threading the wire the back of the stationary casing is slotted as shown at 24 and it is provided at the inner end of the slot with an enlarged eye 25 through which one can enter the free end of the wire when initially directing it to the entry end 17 of the threading tube.

In order that one may better understand this invention I may explain that in measuring teeth a dentist utilizes a piece of comparatively fine wire which he initially loops around the tooth and then twists until it is tight. Customarily this is done by utilizing short lengths of wire cut off from a spool and inserted between jaws which hold it when the work is being done. This is rather a laborious operation as each piece of wire has to be individually cut and then afterward set in the tool.

Figure 4:
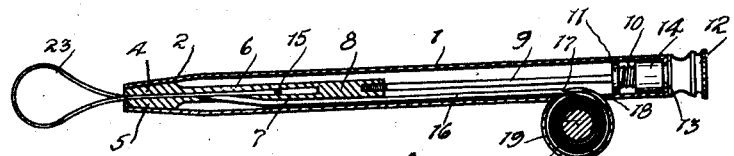
Fig. 4 is a view similar to Fig. 3 with the jaws advanced and the wire loop formed.
Figure 5:
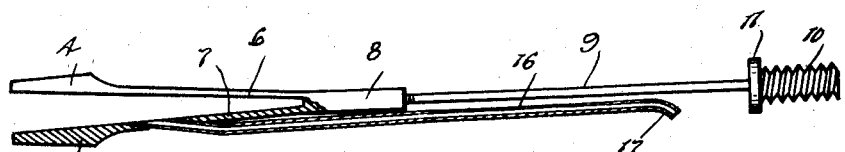
Fig. 5 is an enlarged detailed side view of interior parts, the guide tube and lower jaw being shown in section.
Figure 6:
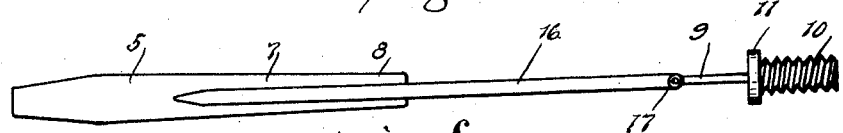
Fig. 6 is an inverted plan view of the parts shown in Fig. 5.
Figure 7:
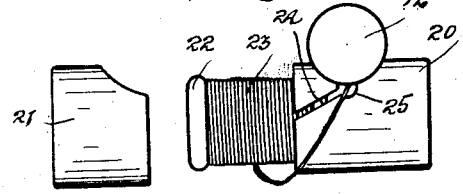
Fig. 7 is an end view of the meter with the spool casing open.

According to my invention the wire spool is mounted in the tool and after one has threaded the wire forwardly through the tube, between the jaws and out through the end of the casing he simply loops the free end of the wire backwardly on itself reentering the tip between the jaws. Then by manipulating the finger piece 12 he advances the jaws into the position shown in Fig. 4 to grip the wire and is then ready to take the tooth measurement by passing the loop over the tooth and then turning the tool around to twist the wire. When the measurement is taken the finger piece is manipulated to release the jaws and free the wire which is then pulled ahead and cut off and one is ready for the next measuring operation.

In initially threading this tool the end of the wire is first entered through the opening 25 and passed ahead through the threading tube and out the front end. Afterward the spool is inserted within the casing and the slot 24 allows any free wire to be wound back on to the spool and of the placing of the removable section 21 of the spool casing in place.

What I claim as my invention is:—

1. In a dental tool in combination, a tubular casing, a pair of movable jaws mounted within the casing, means for clamping or releasing the jaws, a spool holder secured to the casing and opening to the interior thereof and a spool of wire inserted within the holder, threaded between the jaws and extending beyond the tubular casing.

2. In a dental tool in combination, a tubular casing, a pair of gripping jaws within the casing, means for manipulating the jaws, a spool holder secured to and opening into the tubular casing and a spool of wire contained within the holder and having an end entering the casing, passing between the jaws and extending beyond the end of the casing.

3. In a dental tool in combination, a tubular casing, hand manipulated clamping jaws contained within the casing and a spool holder connected to the casing and opening to the interior thereof.

4. In a dental meter, a feeding spool carrying a coil of wire having one end extending from one end of the meter and releasable clamping means located at that end of the meter for gripping and holding the wire.

5. In a dental meter, a tubular casing having a contracted end, a pair of spring jaws operating in the contracted end, means for advancing and receding the jaws, a spool holder connected to the casing and opening to the interior thereof and a spool of wire contained within the holder and threaded through the casing between the jaws and with the end exposed beyond the casing.

6. A dental meter comprising a tubular casing having one end contracted into a conical shape, a pair of spring jaws located within the contracted end of the casing, means for advancing and receding the jaws, means preventing the rotation of the jaws within the casing, a spool holder attached to and opening to the interior of the casing and a spool of wire inserted within the holder and threaded forwardly between the jaws and out the end of the casing.

7. A dental meter comprising a tubular casing having one end contracted into a conical shape, a pair of spring jaws located within the contracted end of the casing, a pin preventing rotary movement of the jaws, an adjusting rod extending from the jaws and terminating in a screw threaded rear end, a finger piece rotatably mounted in respect to the rear end of the casing and provided with a screw threaded sleeve receiving the screw threaded end of the rod, a spool holder secured to the casing and opening to the interior thereof and embodying a stationary and a removable part and a spool of wire mounted in the holder and extending forwardly of the casing between the jaws and out the contracted end of the casing.

8. A dental meter comprising a tubular casing having one end contracted into a conical shape, a pair of spring jaws located within the contracted end of the casing, a pin preventing rotary movement of the jaws, an adjusting rod extending from the jaws and terminating in a screw threaded rear end, a finger piece rotatably mounted in respect to the rear end of the casing and provided with a screw threaded sleeve receiving the screw threaded end of the rod, a spool holder secured to the casing and opening to the interior thereof and embodying a stationary and a removable part, a feeding tube carried by one of the jaws and terminating at the spool holder and a spool of wire contained within the holder, threaded forwardly through the feed tube and between the jaws and out the contracted end of the casing.

Signed at Winnipeg, this 2nd day of July, 1919.

JOSEPH FISHER.

In the presence of—
G. S. ROXBURGH,
K. B. WAKEFIELD.